Patented Apr. 16, 1929.

1,709,284

UNITED STATES PATENT OFFICE.

JOHAN NICOLAAS ADOLF SAUER, OF AMSTERDAM, NETHERLANDS; HONORE AMAND PEDRO MARIE TERVOOREN, REPRESENTATIVE OF THE ESTATE OF SAID JOHAN NICOLAAS ADOLF SAUER, DECEASED, ASSIGNOR TO NAAMLOOZE VENNOOTSCHAP ALGEMEENE NORIT MAATSCHAPPIJ, OF AMSTERDAM, NETHERLANDS, A CORPORATION OF THE NETHERLANDS.

PROCESS FOR THE REGENERATION OR REVIVIFICATION OF PURIFYING, FILTERING, AND DECOLORIZING AGENTS.

No Drawing. Application filed May 24, 1923, Serial No. 641,241, and in Germany May 26, 1922.

If any purifying, filtering or decolorizing agents e. g. so-called decolorizing carbon, wood charcoal, boneblack, blood charcoal, kieselguhr or other infusorial earths, pumice stone, silica, precipitated salts or other compounds, insoluble in the liquid to be treated, as e. g. precipitated carbonate of lime, etc. are caused to act upon organic liquids or solutions of organic matters, as e. g. sugar solutions, glucose, glycerine, fats, oils, alcohol containing liquids, alkaloids, etc., the decolorizing or adsorbing agent will not only take up the inorganic and organic impurities, but it will besides be charged with part of the materials to be purified or refined.

In the burning operation, as applied for revivifying said agents, the organic matter taken up or adsorbed, is carbonized in the known way.

The fine particles of carbon formed in the burning process affect the decolorizing, filtering and adsorbing capacity, while moreover they add to the bulk and weight of the agent.

Attempts have already been made to obviate these drawbacks by trying to remove the organic and inorganic matter prior to the burning operation by means of chemical agents, e. g. acids or alkaline substances, extraction means, or by fermentation.

In practice it was hitherto not possible in most cases to revivify the agents by the use of a chemical purification preceding the burning without impairing the adsorptive capacity.

It was experienced that the fact, that the revivification was not satisfactory in every respect, was due to the formation of fine secondary carbon from said unremoved organic matter by the burning process and that neither by using a mechanical extraction or lixiviation nor by using a preliminary chemical or biological treatment, the organic and inorganic matter taken up could be removed completely or at a sufficient degree from the decolorizing agent.

An object of the present invention is to provide for the removal of said fine (secondary) carbon from the burned decolorizing, filtering or adsorbing agent. According to the invention the regenerated material regains its initial efficiency and physical properties.

I have found as a result of my researches—what was unknown until now in the art of regeneration—that organic matter taken up by the agent, not removed therefrom and carbonized in the burning process to form secondary carbon, can be removed, by treating said agent with suitable chemical agents, viz: with such agents, which are capable of decomposing or dissolving carbonaceous compounds and that by this treatment the full adsorptive capacity could be restored.

Such chemical agents are e. g. concentrated alkaline lyes, sulfuric acid, nitric acid, hydrofluoric acid, hypochlorites, permanganate of calcium, etc., used separately or in combination.

In order to illustrate in which manner my invention may be carried out, the following example is stated:

Use is made of active, so-called decolorizing carbon for the decolorizing of sugar solutions. After use the carbon is washed out with hot water for the purpose of removing therefrom the bulk of sugar, and the carbon is then burned.

The burning operation being accomplished, the carbon is boiled with a 10% solution of caustic soda, preferably under pressure and while energetically stirring; the mixture is thereupon diluted by means of water, so as to lower the concentration of soda to about 2%, and finally the carbon is separated from the sodium lye, e. g. by means of filter presses.

In many cases the process may be advantageously carried out in such a manner that after the treatment with the 10% solution of caustic soda the mixture is settled and the supernatant sodium lye decanted, whereupon the remaining mixture is diluted as described above and filtered. The decanted lye is then ready for reuse without needing any concentration.

The filter cakes are washed out with water and so made suitable for reuse.

In the case the agent has acted upon other substances, such as fats and oils, it may be treated prior to the burning operation with suitable solvents for the purpose of removing as much as possible of the adhering oil. The advantage of this is that a smaller quantity of non-porous carbon is formed and that the regeneration process can be carried out easier and quicker.

The said preliminary treatment is still of greater practical importance in the case a substantial quantity of organic matter has really been adsorbed by the agent.

The above described process (treating with chemicals for the purpose of removing the fine carbon formed) results not only in the removal of substantially all the carbon formed in the burning operation, but also of many inorganic impurities.

The caustic soda used for removing the fine non-porous carbon may be used several times again for the same purpose. The said reused solution may also be employed for treating the spent decolorizing agent prior to the burning operation.

The factors which influence the removal of the formed fine carbon out of the agent are: concentration of the applied chemicals, temperature and pressure at which the treatment is performed, duration of this latter, degree of carbonizing, nature and manner of the carbonizing process.

The amount of chemicals to be applied should be more or less proportionate to the amount of carbon formed in the burning process and of the amount of other impurities present therein. The kind of chemicals to be applied will be chosen in accordance with the nature of the agent to be treated and of the impurities contained therein (i. e. other matters than the carbon formed during the process).

In the practice of the process the burning temperature should not be raised above that required for the regeneration of said agent. Of course the burning temperature will be different for the several agents. A suitable temperature for active carbon is about 400–600° C.

The process is especially advantageous for such decolorizing carbons, which present a certain structure proper (that of the vegetable substances from which they are derived) and which, in contradiction to decolorizing carbons separated from solutions, do not contain large amounts of substances soluble in alkaline lyes.

The removal of non-active carbon can be effected by a number of substances, such as e. g. caustic sodium or potassium, carbonate of sodium or calcium, etc., or by certain active gases, such as e. g. superheated water vapor or carbon dioxide, which may be added prior to or during the burning operation.

The treatment with gases may be followed by the chemical treatments referred to above. Specifically, in the example given with carbon, the burning operation may be followed by treatment with superheated water vapor or carbon dioxide and then the chemical treatment applied or omitted.

The carbon or other purifying, filtering or decolorizing agent may be subjected to a treatment with HCl and a washing, followed by heating to the point of carbonization, after which the chemical treatment may be applied, as for example treatment with caustic soda in the case of carbon.

The formed fine carbon being removed, the regenerated agent may also be subsequently treated with other chemicals, e. g. with hydrochloric or nitric acid, for the object of further purification.

In applying the process according to the present invention for revivifying mineral adsorbing agents, as e. g. kieselguhr, the burning operation can be carried out at temperatures below that at which modifications may occur in the structure, this in order to avoid agglomeration, pulverization or the like of the agent. In the case of kieselguhr, the most suitable temperature is about 300° C. or less. The organic constituents are distilled off below said temperature, preferably with addition of small quantities of air or other gases.

What I claim is:

1. The process of regenerating, purifying, filtering, and decolorizing agents containing absorbed material which comprises heating the agent containing the absorbed material to the point of carbonization of an absorbed material and thereafter extracting such product with an alkaline liquid agent capable of removing products of carbonization of said material.

2. The process of regenerating purifying, filtering, and decolorizing agents containing absorbed material which comprises heating the agent containing the absorbed material to the point of carbonization of an absorbed material and thereafter extracting such product with a caustic soda solution.

3. The process of regenerating purifying, filtering, and decolorizing agents containing absorbed material which comprises heating the agent containing the absorbed material to the point of carbonization of an absorbed material and thereafter extracting such product with a hot caustic soda solution.

4. The process of regenerating purifying, filtering, and decolorizing agents containing absorbed material which comprises heating the agent containing the absorbed material to the point of carbonization of an absorbed material and thereafter extracting such product with a hot caustic soda solution under pressure.

5. The process of regenerating purifying, filtering, and decolorizing agents containing absorbed material which comprises preliminarily removing from the agent absorbed material, heating the agent to the point of carbonization of an absorbed material and thereafter extracting such product with an alkaline liquid agent capable of removing products of carbonization of said material.

6. The process of regenerating purifying, filtering, and decolorizing agents containing absorbed material which comprises preliminarily removing from the agent absorbed material, heating the agent to the point of carbonization of an absorbed material and thereafter extracting such product with a caustic soda solution.

7. The process of regenerating purifying, filtering, and decolorizing agents containing absorbed material which comprises preliminarily removing from the agent absorbed material, heating the agent to the point of carbonization of an absorbed material and thereafter extracting such product with a hot caustic soda solution.

8. The process of regenerating purifying, filtering, and decolorizing agents containing absorbed material which comprises preliminarily removing from the agent absorbed material, heating the agent to the point of carbonization of an absorbed material and thereafter extracting with a hot caustic soda solution under pressure.

9. The process of regenerating decolorizing carbon containing absorbed material which comprises heating the carbon to the point of carbonization of an absorbed material and thereafter extracting with an alkaline liquid agent capable of removing products of carbonization of said material.

10. The process of regenerating decolorizing carbon containing absorbed material which comprises heating the carbon to the point of carbonization of the absorbed material and thereafter extracting with a caustic soda solution.

11. The process of regenerating decolorizing carbon containing absorbed material which comprises heating the carbon to the point of carbonization of an absorbed material and thereafter extracting with a hot caustic soda solution.

12. The process of regenerating decolorizing carbon containing absorbed material which comprises heating the carbon to the point of carbonization of an absorbed material and thereafter extracting with a hot caustic soda solution under pressure.

13. The process of regenerating decolorizing carbon containing absorbed material which comprises preliminarily removing absorbed material from the carbon, heating the carbon to the point of carbonization of an absorbed material and thereafter extracting with an alkaline liquid agent capable of removing products of carbonization of said material.

14. The process of regenerating decolorizing carbon containing absorbed material which comprises preliminarily removing absorbed material from the carbon, heating the carbon to the point of carbonization of an absorbed material and thereafter extracting with a caustic soda solution.

15. The process of regenerating decolorizing carbon containing absorbed material which comprises preliminarily removing absorbed material from the carbon, heating the carbon to the point of carbonization of an absorbed material and thereafter extracting with a hot caustic soda solution.

16. The process of regenerating decolorizing carbon containing absorbed material which comprises preliminarily removing absorbed material from the carbon, heating the carbon to the point of carbonization of an absorbed material and thereafter extracting with a hot caustic soda solution under pressure.

17. The process of regenerating purifying, filtering or decolorizing agents containing absorbed organic material which comprises heating the agent containing the organic material to the point at which carbon is produced from said organic material and acting upon said so formed carbon with an agent capable of removing the same from said first mentioned agent.

18. The process of regenerating purifying, filtering or decolorizing agents containing absorbed organic material which comprises heating the agent containing the organic material to the point at which carbon is produced from said organic material and thereafter extracting the said so formed carbon from said agent with a liquid agent.

19. The process of regenerating decolorizing carbon containing absorbed organic material which comprises heating the said decolorizing carbon to the point at which secondary carbon is formed from said organic material and acting upon the secondary carbon with an agent capable of removing the same from the decolorizing carbon.

20. The process of regenerating decolorizing carbon containing absorbed organic material which comprises heating the said decolorizing carbon to the point at which secondary carbon is formed from said absorbed organic material and thereafter extracting the said decolorizing carbon containing the secondary carbon with a liquid agent capable of separating said secondary carbon from said decolorizing carbon.

In testimony whereof I affix my signature.

JOHAN NICOLAAS ADOLF SAUER.